United States Patent Office 3,702,318
Patented Nov. 7, 1972

3,702,318
THERMALLY STABLE HETEROCYCLIC ANTHRA-
QUINONE POLYIMIDES AND METHOD FOR
THEIR SYNTHESIS
Charles E. Browning, New Carlisle, Ohio, assignor to the
United States of America as represented by the Secre-
tary of the Air Force
No Drawing. Filed Aug. 11, 1971, Ser. No. 170,969
Int. Cl. C08g 20/32
U.S. Cl. 260—47 CP                                10 Claims

ABSTRACT OF THE DISCLOSURE

Aromatic heterocyclic polyimides having a high thermal stability are provided by the condensation of 2,3,6,7-anthraquinonetetracarboxylic dianhydride with an aromatic diamine, such as 2,6-diaminoanthraquinone. The high thermal stability of the polymers renders them suitable for use in many aerospace applications where high temperatures are encountered. In particular, the polymers are useful for producing laminates, molded articles, films, fibers, and ablative materials.

FIELD OF THE INVENTION

This invention relates to polyimides possessing improved thermal and oxidative stabilities. In one aspect the invention relates to a method for synthesizing the polyimides.

BACKGROUND OF THE INVENTION

Polyimides are generally recognized as belonging to a class of polymers that are resistant to thermal degradation in both inert and oxidative environments. In the early work a synthetic approach known as the polyamide-salt technique was utilized in preparing polyimides. According to this method pyromellitic dianhydride was reacted with ethanol to form the diester diacid which was treated with an aliphatic diamine to yield a diester-diacid salt. This salt was then heated to form a polymerizing melt which, after dehydration and dealcoholation, formed the polyimide. When it was attempted to synthesize wholly aromatic polyimides by the same technique, the results obtained were unsatisfactory because of the precipitation of low molecular weight powders during early stages of the reaction. This was due primarily to the fact that aromatic amines are generally not basic enough to form well defined salts. As a remedy to this situation, solution polymerization techniques were subsequently developed. According to this technique, pyromellitic dianhydride and an aromatic diamine are reacted in a suitable solvent at a moderate temperature, e.g., from ambient to 75° C., to obtain a soluble, high molecular weight polyamic acid. The polyamic acid is then dehydrated to yield a high molecular weight polyimide.

It is an object of this invention to provide novel aromatic heterocyclic polyimides that have a high thermal stability.

Another object of the invention is to provide aromatic polyimides that are particularly suitable for use in high temperature applications.

A further object of the invention is to provide a process for synthesizing the aromatic polyimides.

Other and further objects and advantages of the invention will become apparent to those skilled in the art upon consideration of the accompanying disclosure.

SUMMARY OF THE INVENTION

In one embodiment, the present invention resides in a polyimide having the following structural formula:

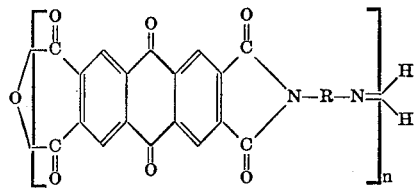

wherein R is a divalent aromatic radical, such as para-phenylene, meta-phenylene, biphenylene, fused ring radicals having 2 or 3 aromatic nuclei with the nitrogen atoms being attached to separate aromatic nuclei, a radical having the following formula:

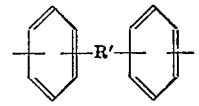

and a radical having the following formula:

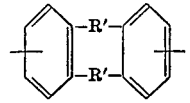

wherein R' is a divalent radical selected from the group consisting of oxygen, carbonyl, sulfonyl, sulfoxide, and —NH—, and $n$ is an integer equal to at least 2, preferably an integer from about 8 to 100, inclusive. Generally when the polyimide is in the form of a powder, $n$ has a value of 8 to 10, inclusive. In the case of the polyimide films, $n$ is usually greater than 10, e.g., in the range of about 10 to 100, inclusive. Alternatively, $n$ can be defined as having a value sufficient to provide an inherent viscosity of at least 0.05, e.g., from about 0.05 to 5, when measured at 25° C. as a 0.1 percent by weight solution in concentrated sulfuric acid. Also, $n$ is an integer having a value sufficient to provide a film-forming polymer.

In another embodiment, the present invention is concerned with a process for preparing aromatic heterocyclic polyimides. Broadly speaking, the process comprises the step of reacting 2,3,6,7-anthraquinonetetracarboxylic dianhydride (ATCDA) with an aromatic diamine in the presence of an organic solvent and at a temperature ranging from about ambient temperature to 250° C.

The process is preferably carried out under anhydrous conditions, utilizing as the reaction medium an organic compound that is a solvent for at least one of the reactants. Examples of suitable solvents include N-methylpyrrolidone, N,N - dimethylformamide, N,N-dimethylacetamide, hexamethylphosphoramide, pyridine, dimethylsulfoxide, and the like.

The temperature at which the condensation reaction is conducted depends upon the type of product that is desired. When preparing polyimides in the form of a powder, the temperature generally falls in the range of 100 to 250° C., preferably in the range of 175 to 225° C. The reaction period will depend upon the particular temperature utilized, being longer for lower temperatures and shorter for higher temperatures. Generally the reaction time falls in the range of 2 to 24 hours although shorter and longer periods can be utilized. In a preferred procedure, the condensation reaction is carried out at a temperature in the range of 175 to 225° C. for a period of 6 to 10 hours. After cooling the reaction mixture, the precipitate in the form of a powder is separated as by filtration and then washed with water and/or acetone to remove unreacted reagents. The powder is then heated under a vacuum at a temperature ranging from 120 to 170° C. for 3 to 8 hours to remove any residual traces of water and solvent after which it is heated in an inert atmosphere at an elevated temperature, e.g., 300 to 400° C., for 0.5 to 2 hours to insure complete cyclization. The reaction involved when preparing the polyimide in powder form can be represented by the following equation:

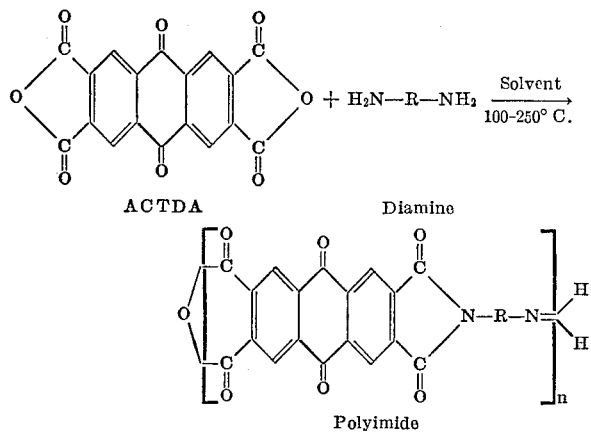

where R and n are as indicated above.

When preparing a polyimide film or other shaped article, the polymerization reaction is initially carried out at a comparatively low temperature, e.g., from ambient temperature to about 80° C. The reaction is carried out at this temperature for a period of time sufficient to form a polyamic acid, the polyimide precursor. This period generally ranges from 5 to 12 hours, depending upon the reaction temperature. Thereafter, the polyamic acid, cast or extruded into a desired shape, such as a film or filament, preferably while still in the solvent, is heated to an elevated temperature of 400° C. and higher to convert the polyamic acid to corresponding polyimide. The reactions involved in preparing shaped articles can be represented by the following equation:

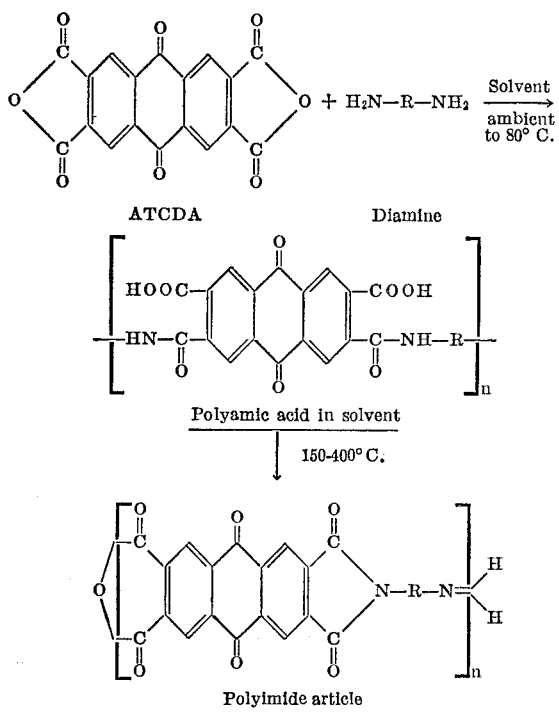

where R and n are as indicated above.

The conversion of the polyamic acid to the polyimide is preferably accomplished by heating the cast or extruded article, e.g., in a circlulating air furnace or under a vacuum, at a temperature and for a time sufficient to evaporate the solvent. This temperature will, of course, vary depending upon the boiling point of the particular solvent used. Thereafter, the polyamic acid is heated in an inert atmosphere or under a vacuum to an elevated temperature, e.g., up to 400° C. and higher, to convert the polyamic acid to the polyimide. It is often preferred to employ a stepwise heating procedure or cycle. Thus, in the first step, the precursor is heated under a vacuum at a temperature ranging from 150 to 200° C. for a period of 12 to 24 hours. This initial step assures that any remaining solvent is removed. At the end of the initial heating period, the temperature is increased to about 275 to 325° C., and heating is continued at this temperature in an inert atmosphere or under a vacuum for a period of about 0.5 to 1.5 hours. Thereafter, the temperature is increased by an increment of about 25 to 75° C., and the heating is continued in an inert atmosphere or under a vacuum for another period of about 0.5 to 1.5 hours. One or more additional heating periods can then be carried out at an increasing temperature up to about 425° C. Any dry inert gas, such as nitrogen, helium or argon, can be employed in the heating step.

In conducting the process of this invention, equimolar amounts of the 2,3,6,7-anthraquinonetetracarboxylic dianhydride and the aromatic diamine are generally used. However, it is often desirable to employ a small excess of the dianhydride, e.g., up to about 1.1 mol of dianhydride per mole of diamine.

The aromatic diamines utilized in the process correspond to the formula $H_2N-R-NH_2$, where R is a radical as defined above. Examples of suitable diamines include meta-phenylene diamine, para-phenylene diamine, benzidine, 1,5-diaminonaphthalene, 2,6-diaminoanthracene, 4,4'-diaminodiphenyl sulfone, 2,6-diaminodiphenyl disulfoxide, 4,4'-diaminodiphenyl methane, 4,4'-diaminodiphenyl sulfide, 4,4'-diaminodiphenyl ether, 4,4'-diaminodiphenyl amine, 2,6-diaminodihydrophenazine, 2,6'-diaminodiphenyl dioxide, 2,6'-diaminodiphenyl disulfone, 2,6-diaminoanthraquinone, and the like. Of the various diamines, it is preferred to utilize a phenylene diamine or 2,6-diaminoanthraquinone, with the latter compound being particularly preferred.

A more complete understanding of the invention can be obtained by referreding the the following illustrative examples which are not intended, however, to be unduly limitative of the invention.

EXAMPLE I

Synthesis of 2,3,6,7-anthraquinonetetracarboxylic dianhydride 2,3-dimethylbutadiene (25 grams; 0.305 mol) was reacted with p-benzoquinone (16.2 grams; 0.150 mol) in 100 cc. of refluxing toluene for 48 hours. After cooling the reaction mixture, a product precipitated that was filtered and washed with warm ethanol to remove unreacted reagents. Twenty-seven grams of the product tetramethyloctahydroanthraquinone having a melting point of 202–203° C. was obtained, representing a yield of 90 percent. A solution of potash in ethanol (100 cc.; 5 g. KOH) was added to 10 grams of the aforementioned condensation product in boiling ethanol to yield a thick, white suspension. Oxygen was passed through the suspension while boiling under reflux conditions for a period of 8 hours. White crystals slowly dissolved to a deep red solution and yellow crystals began to separate until finally the solution was nearly decolorized. 2,3,6,7-tetramethylanthraquinone having a melting point of 330° C. was obtained in quantitative yield in the form of yellow needles upon crystallization from acetic acid.

Tetramethylanthraquinone (1.50 g.; 0.00568 mol), obtained as described above, was oxidized by reacting it with 30 cc. of 20 percent nitric acid at 200° C. for 6 hours. The resulting product was dissolved in a sodium carbonate solution which was then filtered. Acidification of the filtrate precipitated 2,3,6,7-anthraquinonetetracarboxylic acid, a yellow powder that decomposed at 420° C. After the precipitate had been washed with distilled water until the washings were neutral and then dried, 2.15 grams of the acid was obtained, representing a yield of 98.6 percent.

2,3,6,7-anthraquinonetetracarboxylic acid (4 g.; 0.0104 mol) was converted to its dianhydride by reacting it with refluxing acetic anhydride (50 cc.) for one hour. The product was washed with hot acetic acid and then with hot distilled water until the washings were neutral. 2,3,6,7-anthraquinonetetracarboxylic dianhydride, a light yellow powder having a melting point greater than 300° C. was obtained in the amount of 3.11 grams, representing a yield of 86 percent. The product was analyzed with the following results being obtained:

Calculated for $C_{18}H_2O_8$ (percent): C, 62.08; H, 1.16; O, 36.76. Found (percent): C, 62.10; H, 1.15; O, 36.75.

EXAMPLE II 2,3,6,7-anthraquinonetetracarboxylic dianhydride (3.48 g.; 0.01 mol) was reacted with 2,6-diaminoanthraquinone (2.38 g.; 0.01 mol) in 200 cc. of N-methylpyrrolidone at 200° C. for eight hours. After cooling, a brown solid in the form of a powder precipitated from the reaction mixture. The precipitated powder was recovered by filtration and washed several times with hot N-methylpyrrolidone until the washings were clear. The product was then washed several times with hot acetone and dried under a vacuum at 160° C. for 8 hours. Thereafter, the powder was heated in dry argon from room temperature to 350° C. and held at 350° C. for one hour. The product was obtained in a yield of 76 percent.

Analysis of the product gave the following results:

Calculated for $C_{32}H_{10}N_2O_8$ (percent): C, 69.83; H, 1.83; N, 5.09; O, 23.25. Found (percent): C, 69.50; H, 2.01; N, 5.10; O, 23.29.

The polymer obtained had an inherent viscosity of 0.08 when measured at 25° C., as a 0.1 weight percent solution in concentrated sulfuric acid. The infrared spectrum of the polymer showed the characteristic imide doublet at 5.6 and 5.8 microns.

The foregoing analyses show that the product was a polyimide having the structure represented by the following formula:

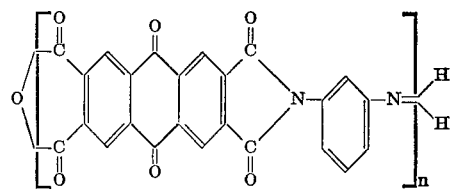

Thermogravimetric analysis (TGA) and differential thermal analysis (DTA) were performed on the polymer in both oxidizing and inert atmospheres. The TGA in air showed that the polymer does not undergo any significant weight loss below 450 to 500° C. In helium no significant weight loss was observed until temperatures of 550 to 600° C., were reached. The DTA obtained in air and helium were quite similar with both showing small positive slopes. No large endotherms or exotherms were observed at temperatures ranging from room temperature up to about 500° C.

EXAMPLE III 2,3,6,7-anthraquinonetetracarboxylic dianhydride (1.0 g.; 0.00287 mol) was reacted with m-phenylenediamine (0.31 g.; 0.00287 mol) in 100 cc. of N-methylpyrrolidone at 200° C. for 8 hours. After cooling, the dark brown powder that precipitated was filtered and washed several times with hot N-methylpyrrolidone until the washings were clear. The product was then washed several times with hot acetone and dried under a vacuum at 160° C. for 8 hours. The powder was finally heated in dry argon from room temperature to 350° C. and was held at this latter temperature for one hour. The product was obtained in a yield of 73 percent.

Analysis of the product gave the following results:

Calculated for $C_{24}H_8N_2O_6$ (percent): C, 68.58; H, 1.92; N, 6.66; O, 22.84. Found (percent): C, 68.23; H, 2.10; N, 6.68; O, 22.99.

The product had an inherent viscosity of 0.20 when measured at 25° C. as an 0.2 weight percent solution in concentrated sulfuric acid. The infrared spectrum of the polymer showed the characteristic imide doublet at 5.6 and 5.8 microns.

The foregoing analyses show that the product was a polyimide having a structure that is represented by the following formula:

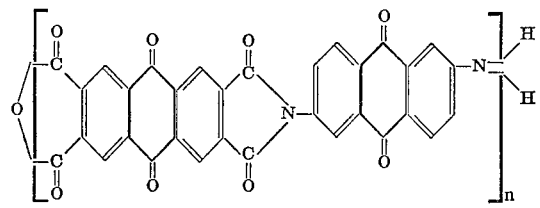

TGA and DTA were performed on the polyimide product in both oxidizing and inert atmospheres. The TGA data obtained in air showed that the product did not exhibit any significant weight loss until temperatures of 450 to 500° C. were reached. In helium no significant weight losses were observed until temperatures of 550 to 600° C. were reached. The DTA data obtained in air and helium were very similar. Both showed small positive slopes and dehydration endotherms. No large endotherms or exotherms were observed at temperatures ranging from room temperature to 500° C.

EXAMPLE IV 2,3,6,7-anthraquinonetetracarboxylic dianhydride (0.15 g.; 0.00043 mol) was added slowly with stirring to a solution of 2,6-diaminoanthraquinone (0.1 g.; 0.00043 mol) in 7.0 grams of N-methylpyrrolidone and 1.0 gram of acetic acid at 75° C. The mixture was allowed to react at 75° C. for 7.5 hours. A polyamic acid film, the precursor for polyimide film, was cast on mercury positioned in a circulating air furnace. After a period of 3 hours at a temperature of 85° C., the polyamic acid film was removed from the mercury. The polyamic acid was converted to the polyimide by proceeding in accordance with the following heating cycle:

(1) 16 hours at 160° C. in vacuo,
(2) 1 hour at 300° C. in dry helium,
(3) 1 hour at 350° C. in dry helium, and
(4) 1 hour at 400° C. in dry helium.

A strong polyimide film having a thickness of 0.5 mil was obtained. After being heated at 400° C. for 30 hours in a 100 percent oxygen atmosphere, the film showed a weight retention of 35 percent.

EXAMPLE V 2,3,6,7 - anthraquinonetetracarboxylic dianhydride (0.5032 g.; 0.00143 mol) was slowly added while stirring to a solution of m-phenylenediamine (0.154 g.; 0.00143 mol) in 10 grams of N-methylpyrrolidone at 40° C. The reaction was allowed to continue for 20 hours. A polyamic acid film, the polyimide film precursor, was cast by adding the reaction mixture to an aluminum dish so as to provide a solution having a thickness of 0.1 inch. The aluminum dish containing the solution was then subjected to the following conditions:

(1) 1.5 hours at room temperature in vacuo,
(2) 2.5 hours at 75° C. in vacuo, and
(3) 0.5 hour at 100° C. in vacuo.

The polyamic acid film was removed from the dish and converted to the polyimide film by heating in accordance with the following stepwise cycle:

(1) 16 hours at 150° C. in vacuo,
(2) 1 hour at 300° C. in dry helium,
(3) 3 hours at 350° C. in dry helium, and
(4) 3 hours at 400° C. in dry helium.

A strong, flexible polyimide film having a thickness of 0.9 mil was obtained. The film showed a 35 percent weight retention after 14 hours at 400° C. in a 100 percent oxygen atmosphere.

As seen from the data in the foregoing examples, the polyimides of this invention possess a high degree of thermal stability. In particular, it is noted that the polymers showed a high weight retention even when heated at an elevated temperature for an extended period of time in pure oxygen. This property of the polymers makes them particularly useful in preparing articles which are subject to high temperatures and oxidizing environments. By using a solution of the precursor polyamic acid, polyimide composites can be readily fabricated. Furthermore, shaped articles can be prepared from the powders by using pressure molding techniques. The polyimides can also be utilized for manufacturing films, fibers, tubing, and the like by casting and extrusion procedures.

In view of the foregoing disclosure, it is apparent that modifications of the invention can be made by those skilled in the art without departing from the spirit and scope of the invention.

I claim:

1. A thermally stable polyimide consisting essentially of a polymer having the following structural formula:

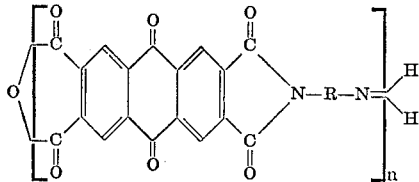

wherein R is a divalent aromatic radical and $n$ is an integer equal to at least 2.

2. The polyimide of claim 1 in which R is a divalent aromatic radical selected from the group consisting of para-phenylene, meta-phenylene, fused ring radicals having 2 or 3 aromatic nuclei with the nitrogen atoms being attached to separate aromatic nuclei, a radical having the following formula:

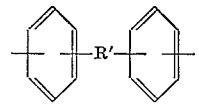

and a radical having the following formula:

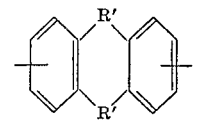

wherein R' is a divalent radical selected from the group consisting of oxygen, carbonyl, sulfonyl, sulfoxide, and —NH— and $n$ is an integer from about 8 to 100, inclusive.

3. The polyimide of claim 2 in which R is para-phenylene.
4. The polyimide of claim 2 in which R is meta-phenylene.
5. The polyimide of claim 2 in which R is

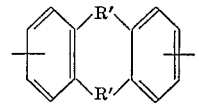

6. The polyimide of claim 5 in which R' is oxygen.
7. The polyimide of claim 5 in which R' is carbonyl.
8. The polyimide of claim 2 in which R is biphenylene.
9. The polyimide of claim 2 in which R is

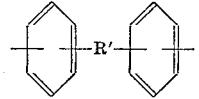

10. The polymide of claim 9 in which R' is carbonyl.

References Cited
UNITED STATES PATENTS

| | | | |
|---|---|---|---|
| 3,179,630 | 4/1965 | Endrey | 260—78 |
| 3,422,061 | 1/1969 | Gall | 260—47 |
| 3,179,631 | 4/1965 | Endrey | 260—78 |

WILLIAM H. SHORT, Primary Examiner

L. L. LEE, Assistant Examiner

U.S. Cl. X.R.

117—132 B, 161 P; 260—30.8 R, 32.6 N, 65, 78 TF, 326 N